US009288188B2

(12) United States Patent
Brandstatter (10) Patent No.: US 9,288,188 B2
(45) Date of Patent: *Mar. 15, 2016

(54) COMPUTER COMMUNICATION SYSTEM FOR COMMUNICATION VIA PUBLIC NETWORKS

(71) Applicant: HOB GmbH & Co. KG, Cadolzburg (DE)

(72) Inventor: Klaus Brandstatter, Rosstal (DE)

(73) Assignee: HOB GMBH & CO. KG, Cadolzburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,399

(22) Filed: Jul. 30, 2014

(65) Prior Publication Data

US 2014/0337962 A1    Nov. 13, 2014

Related U.S. Application Data

(63) Continuation of application No. 12/039,500, filed on Feb. 28, 2008, now Pat. No. 8,910,272.

(51) Int. Cl.
*G06F 9/00* (2006.01)
*G06F 15/16* (2006.01)
(Continued)

(52) U.S. Cl.
CPC .......... *H04L 63/0272* (2013.01); *H04L 63/029* (2013.01); *H04L 67/02* (2013.01); *H04L 67/34* (2013.01); *H04L 63/166* (2013.01)

(58) Field of Classification Search
CPC .................................................. H04L 63/0272
USPC .......................................................... 726/2, 12
See application file for complete search history.

(56) References Cited

U.S. PATENT DOCUMENTS 5,452,460 A * 9/1995 Distelberg et al. ............. 719/321
7,366,188 B2 * 4/2008 Kim .............................. 370/401
(Continued)

FOREIGN PATENT DOCUMENTS

WO    2005/020035 A2    3/2005
WO    2006004725 A       1/2006

OTHER PUBLICATIONS

Cotton et al. "Special Use IPv4 Addresses" Internet Engineering Task Force (IETF), ISSN: 2070-1721, Jan. 2010.
(Continued)

*Primary Examiner* — Dant Shaifer Harriman
(74) *Attorney, Agent, or Firm* — Browdy and Neimark, PLLC (57) ABSTRACT

A computer communication system including a client computer with an installed virtual private network (VPN) client and located in a public network, a server computer located in a corporate network, a web server remote from the client computer, a gateway computer located in the corporate network, and a VPN server computer located in the corporate network. The computer communication system is adapted to run following steps of providing a safe VPN communication connection between the client and the server computers: the client computer, using a WEB browser, downloads an application from the VPN server computer, and the downloaded application automatically configures the VPN client installed on the client computer and establishes a tunnelled connection from the client computer to the corporate network. All packets generated by the installed VPN client are forwarded through the tunnelled connection via the gateway computer to the VPN server in the corporate network.

4 Claims, 6 Drawing Sheets

(51) Int. Cl.
*G06F 17/00* (2006.01)
*H04L 29/06* (2006.01)
*H04L 29/08* (2006.01)

(56) References Cited

U.S. PATENT DOCUMENTS

| | | |
|---|---|---|
| 7,389,534 B1 | 6/2008 | He |
| 2005/0262357 A1 | 11/2005 | Araujo et al. |
| 2006/0159048 A1 * | 7/2006 | Han et al. ............ 370/331 |
| 2007/0150946 A1 * | 6/2007 | Hanberger et al. ............ 726/15 |
| 2008/0075090 A1 | 3/2008 | Farricker et al. |

OTHER PUBLICATIONS

Khanvilkar and Khokhar, "Experimental evaluations of Open-Source Linux-based VPN solutions," 13th Annual Conference on Computer Communications and Networks (ICCCN Proceedings) p. 182, col. 2 (2004).

European Patent Office Search Report issued in Application No. EP 0900150.1 on Jun. 24, 2009.

* cited by examiner

COMPUTER COMMUNICATION SYSTEM FOR COMMUNICATION VIA PUBLIC NETWORKS

BACKGROUND OF THE INVENTION

1. Field

The invention relates to a computer communication system for communicating via public networks in general, and in particular to a method of encapsulating and encrypting data to ensure confidentiality combined with reliable transport features within so called Virtual Private Networks (VPN).

2. Background

Computer networks have become a central part of the corporate infrastructure in business organizations of all sizes. A challenge that continues to face organizations is how to connect remote users who need to access their email and internal servers while away from the office in a most reliable, flexible and cost-effective manner.

Virtual Private Networks (VPNs) are used to connect people like home workers or sales personal while travelling with their corporate network. With VPNs one can create a secure private network utilizing some other public network such as the public Internet, which might be less secure.

For these VPNs network protocols like IPSec, PPTP or L2TP are used. These protocols will be discussed in greater detail in the discussion below.

In the following the computer initiating a VPN connection is referred to as a VPN client. The computer responding to the initiation of the VPN connection is referred to as a VPN server. A VPN server is typically placed in an organizations DMZ (demilitarized zone) which is a network that is separated from the internal network and the public network by the use of firewalls.

To better understand the background of the invention also the prior art is to be explained in more detail referring to FIG. 1-5, the contents of which is presented in the passage "BRIEF DESCRIPTION OF THE DRAWINGS" below.

Figure 1:
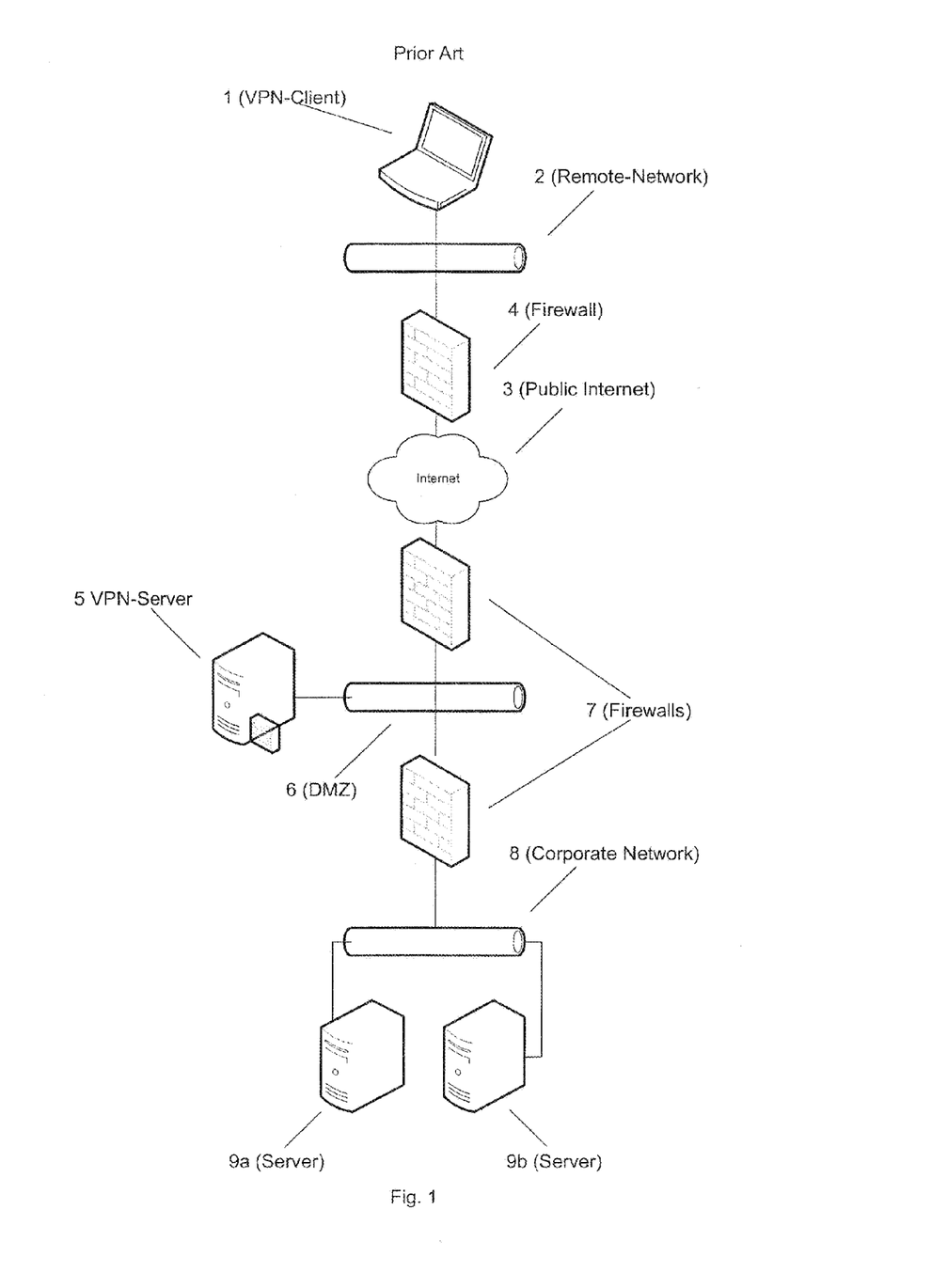
FIG. 1 is a schematic overview of a prior art VPN computer communication system.

FIG. 1 is a diagram that shows the major functional components of a VPN. The system comprises a computer that works as a VPN client 1 which is physically connected to a remote network 2. This remote network 2 is separated from the public Internet 3 by the use of a firewall 4.

At the other end there is a VPN server 5, which is physically connected to a network segment that belongs to a DMZ 6. The DMZ 6 is part of a firewall system 7 which separates the DMZ 6 from the outside public Internet 3 and the inside corporate network 8. Inside the corporate network 8 there is a number of servers 9 to which the VPN client 1 might wish to connect.

Personal computers and notebooks used today are equipped with operating systems like Microsoft Windows, MAC OS or Linux. In parts of these operating systems, clients for Virtual Private Networks are already included. But initially these VPN clients are not ready configured for use. At least they need information about a specific VPN server as a remote station in the corporate network.

In case other VPN clients, i.e. VPN-client software that is not integrated into the operating system, are used, they need to be manually installed and configured. This installation work often requires administrator rights. Due to the fact that most computer user do not have such rights, the installation of said VPN-client software cannot be done by all users themselves. In case of big companies there may be thousands of VPN-clients each have to be supported by the company IT staff which service may be very expensive and time-consuming.

Figure 2:
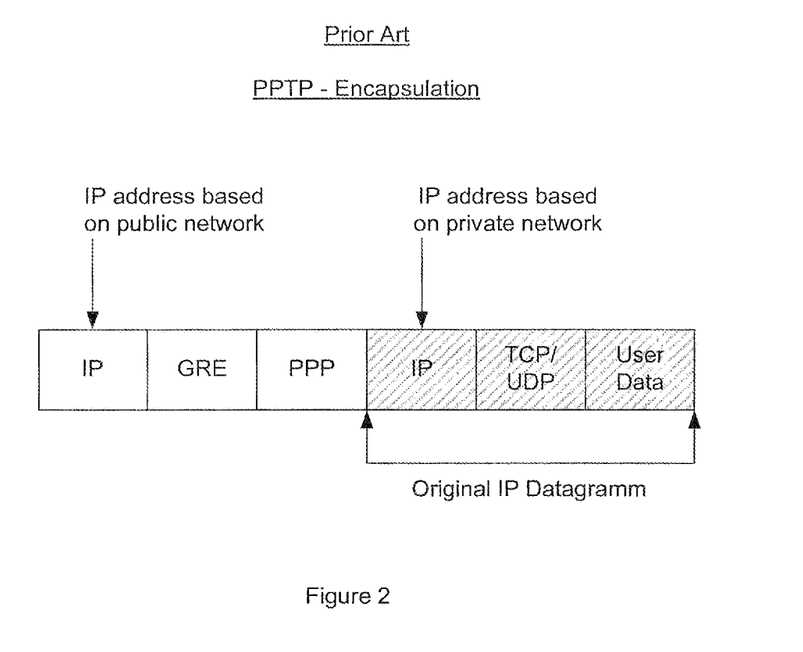
FIG. 2-5 are datagram representations illustrating PPTP-encapsulation, L2TP-encapsulation with and without IPSec-encryption and protocol encapsulation used with SSTP.

Today most of the VPN clients, which are built into the operating system, use protocols like PPTP or L2TP. PPTP, the "Point-to-Point Tunnelling Protocol" is defined by the Internet Engineering Task Force (IETF) in the document RFC 2637. As is illustrated in FIG. 2 PPTP encapsulates VPN data inside PPP packets, which are then further encapsulated in IP datagrams for transmission over a transit IP network such as the public Internet. PPP, the "Point-to-Point Protocol" is defined in RFC 1661.

The PPTP uses a TCP connection (TCP Port 1723) for creation and maintenance of a PPTP tunnel VPN data are encapsulated in a header of the type GRE, Generic Route Encapsulation.

Figure 3:
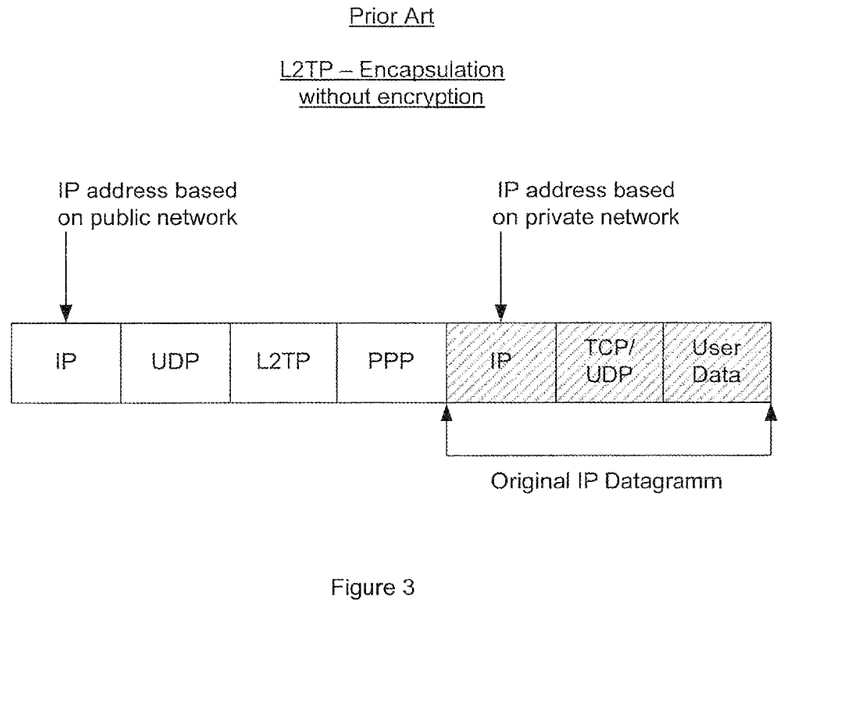

VPN clients built into the operating system may alternatively use the L2TP, the "Layer Two Tunnelling Protocol" (see RFC 2661). FIG. 3 illustrates the L2TP-Encapsulation without encryption. As becomes apparent from the drawing L2TP also encapsulates the data within PPP packets and adds a specific L2TP header. L2TP packets are sent via UDP Port 1701.

Figure 4:
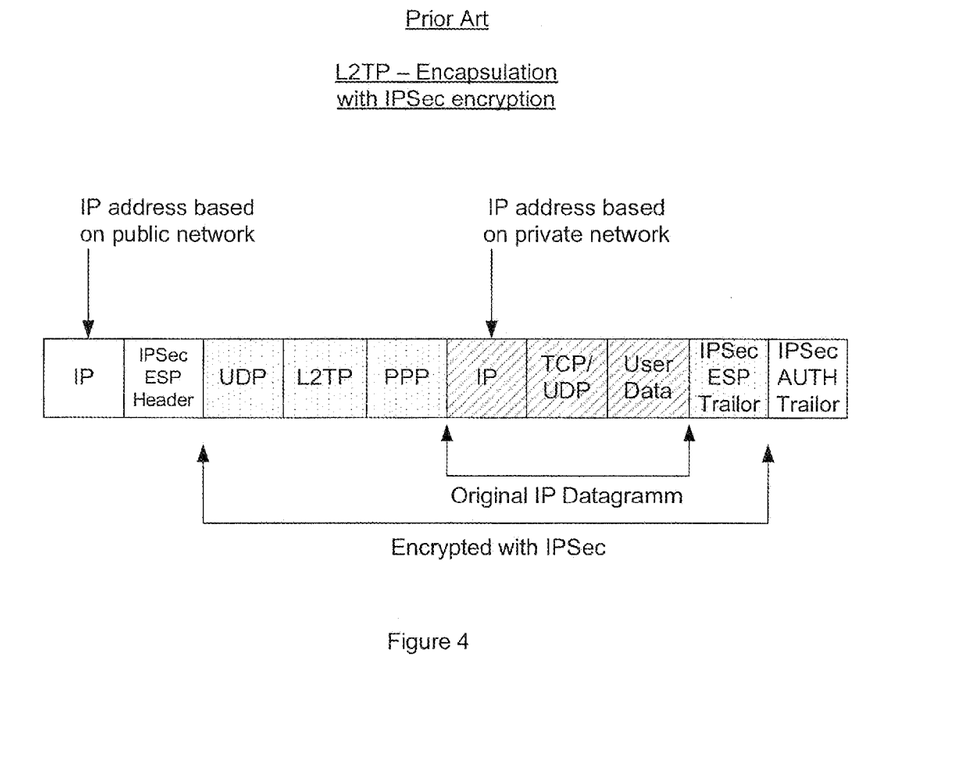

As is shown in FIG. 4 L2TP may also be secured by an IPSec encryption, which is defined in RFC 3193 "Securing L2TP using IPSec". When L2TP is secured via IPSec, the IPSec Key-Exchange ISAKMP ("Internet Security Association and Key Management Protocol"—defined in RFC 2408) is handled over UDP Port 500. The L2TP data encrypted with IPSec uses IP packets of the type ESP (Encapsulated Security Payload—RFC 2406).

The encapsulation methods described above (IPSec, PPTP or L2TP) are well known for persons skilled in the art for years, but they cannot be used by the VPN-clients everywhere. There are many locations, where a user may want to have a connection to its remote corporate or home network, but these locations might be connected to the public Internet through a firewall.

In most of the cases these firewalls block all traffic from the internal networks to the public Internet with the exception of outgoing connections for some specific protocols like HTTP, the "Hypertext Transport Protocol"—TCP Port 80 and HTTPS, the "Hypertext Transport Protocol Secure"—TCP Port 443. HTTP and HTTPS are not blocked, since these protocols are usually used for "browsing" the Internet. The security policies of most companies allow using said protocols to communicate with destinations in the public Internet.

HTTPS means HTTP over SSL with the standard TCP port 443. SSL, the "Secure Sockets Layer" is a cryptographic system which provides an encrypted data stream for secure communication on insecure networks. For this purpose SSL uses a public key infrastructure with public and private keys. The public key is known to everyone but the private key is only known to the recipient. In this way the sender can encrypt a data message by use of the recipient's public key and only the recipient who holds the private key can decrypt the message.

These are all techniques which are well known in the art.

Current firewall systems may also contain proxies, which have to be passed when sending data from the internal network to the public Internet. Protocols for these proxies include HTTP or the SOCKS protocol (see RFC 1928). The Web-Browsers internal to such locations have to be configured, so that traffic to the public Internet uses the aforesaid protocols to get a path through the firewalls via the proxies.

Because HTTPS and SSL can be used at most locations with Internet access, another type of VPN has emerged, the so-called SSL-VPN. In most cases SSL-VPNs use TCP port 443, which is normally used for encrypted HTTPS-connections to the public Internet and therefore traffic destined to TCP port 443 is not blocked at the firewalls.

Now there are two different kinds of SSL-VPN depending on the need of a specific client. The first type of SSL-VPN does not need specific client software and the traffic only goes to (HTTP) Web-Servers. The access techniques used for this type of SSL-VPN work as follows:

Before a client application may access resources on the corporate network the user has to start a browser application and has to navigate to a specific web page which acts as an entry point to the VPN. After authentication the user has access to the VPN and specific applications running on the client computer may connect to resources on the corporate network. This technique is also known as the "application proxy" model.

The second type of SSL-VPN works with client software. For this second type there are those SSL-VPN clients which just listen on the "localhost" address. "Localhost" is a special IP-address which always translates to the so-called loopback IP-address (127.0.0.x), which is the local machine itself. Such clients can also be downloaded from a Web-Server and need no local installation. This solution, however, has limited usability, because not all the traffic can be routed over aforesaid localhost address. Reason for this is the fact that special configuration is necessary and also that often network address translation (NAT) is in use. This means the IP-addresses are translated into other IP-addresses, and these are no longer valid when localhost is used as an intermediate gateway.

Clients for SSL-VPN can also be installed into the operating system of the VPN-client machine. In this case the client uses drivers to the operating system, like virtual adapters. All these software parts have to be installed which again means the user has to have administrator rights. But with these drivers, transparent access to all target computers in the corporate network is possible, and as an additional advantage one can reach the remote VPN-client from the corporate network. When the term "transparent access" is used here, this means that all network packets with an IP-header can be forwarded between the client and the corporate network and vice versa. This includes such protocols as TCP, UDP, ICMP and so on.

Summing up the above discussion, with the current technology, if a user needs really transparent access to the corporate network, software with drivers has to be installed on his client computer.

There is another problem that exists in the connection with software including drivers. Drivers are very difficult to develop, and so most available drivers are not error-free and often cause problems.

Figure 5:
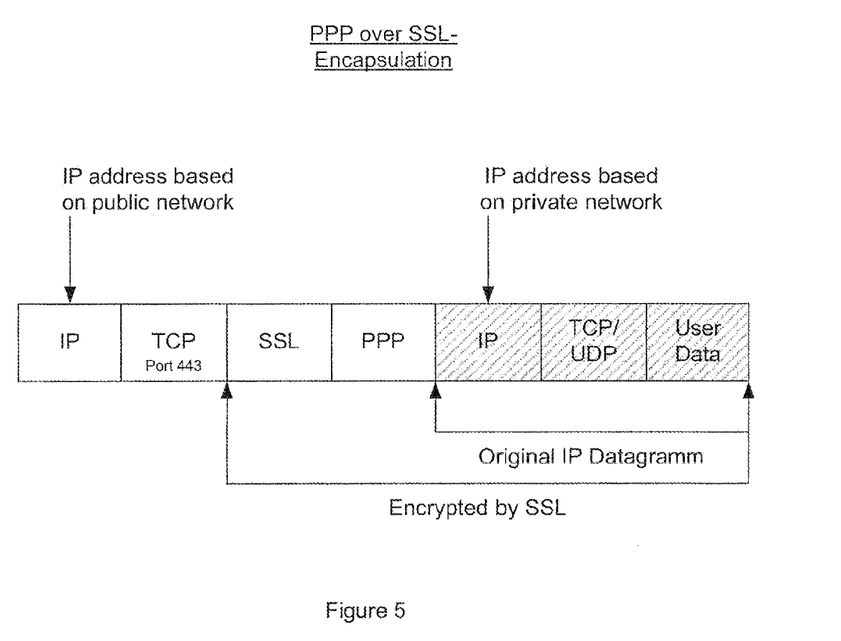

Now there is a newer form of SSL-VPN deployed by Microsoft, which becomes apparent from FIG. 5. It is called SSTP, the "Secure Socket Tunnelling Protocol". This protocol has features that allow traffic to pass through firewalls that block PPTP and L2TP/IPSec traffic. SSTP provides a mechanism to encapsulate PPP traffic over the SSL channel of the HTTPS protocol. By this way traffic will flow through TCP port 443, a commonly used port for Web access. The use of PPP allows support for strong authentication methods. SSTP is integrated in certain Microsoft® operating systems beginning with "Windows® Vista® SP1" or "Windows® Server 2008 SP1". However, also with SSTP there is the need to manually configure the SSTP-software at the VPN client computer.

Again summarizing the above statements, with SSL-VPN you can avoid some of the problems which exists in certain traditional VPN environments but there are still other problems to solve such as the need of SSL-VPN solutions to install and configure software at the VPN-client computer, which is not possible under certain circumstances or at least very time-consuming and expensive if a vast number of clients exists.

SUMMARY

Accordingly it is an object of the invention to provide for a computer communication system in which data transmission within a VPN can be realized regardless of any restrictions imposed by the necessity of installing special VPN client software on the client computer or due to the fact that the public internet is bulkheaded off from the client computer and corporate network by means, e.g., of firewalls.

This object is achieved by a computer communication system according to the invention, which includes a computer communication system, comprising
    a client computer with an installed virtual private network (VPN) client and located in a public network,
    at least one server computer located in a corporate network,
    a web server remote from said client computer,
    a gateway computer located in said corporate network, and
    a VPN server computer located in said corporate network,
        wherein the computer communication system is adapted to run following steps of providing a safe VPN communication connection between said client and at least one of said server computers:
    said client computer, using a WEB browser, downloads an application from said VPN server computer, and
    said downloaded application automatically configures the VPN client installed on said client computer and establishes a tunnelled connection from said client computer to said corporate network, wherein all packets generated by the installed VPN client are forwarded through said tunnelled connection via the gateway computer to the VPN server in said corporate network.

The new approach of the present invention is that PPP, PPTP or L2TP is tunnelled using SSL without the necessity to manually install and configure VPN client software. PPP, PPTP or L2TP is done by the operating system of the VPN client computer, as these protocols are integrated parts of most operating systems. Therefore there is no need to install separate VPN software at the client.

BRIEF DESCRIPTION OF THE DRAWINGS

The invention will be described in more detail in the following explanation of preferred embodiments referring to the accompanying drawings, in which.

DETAILED DESCRIPTION

FIG. 1 through 5 were already explained in the introducing part of the specification. The according information is not to be repeated at this point.

Figure 6:
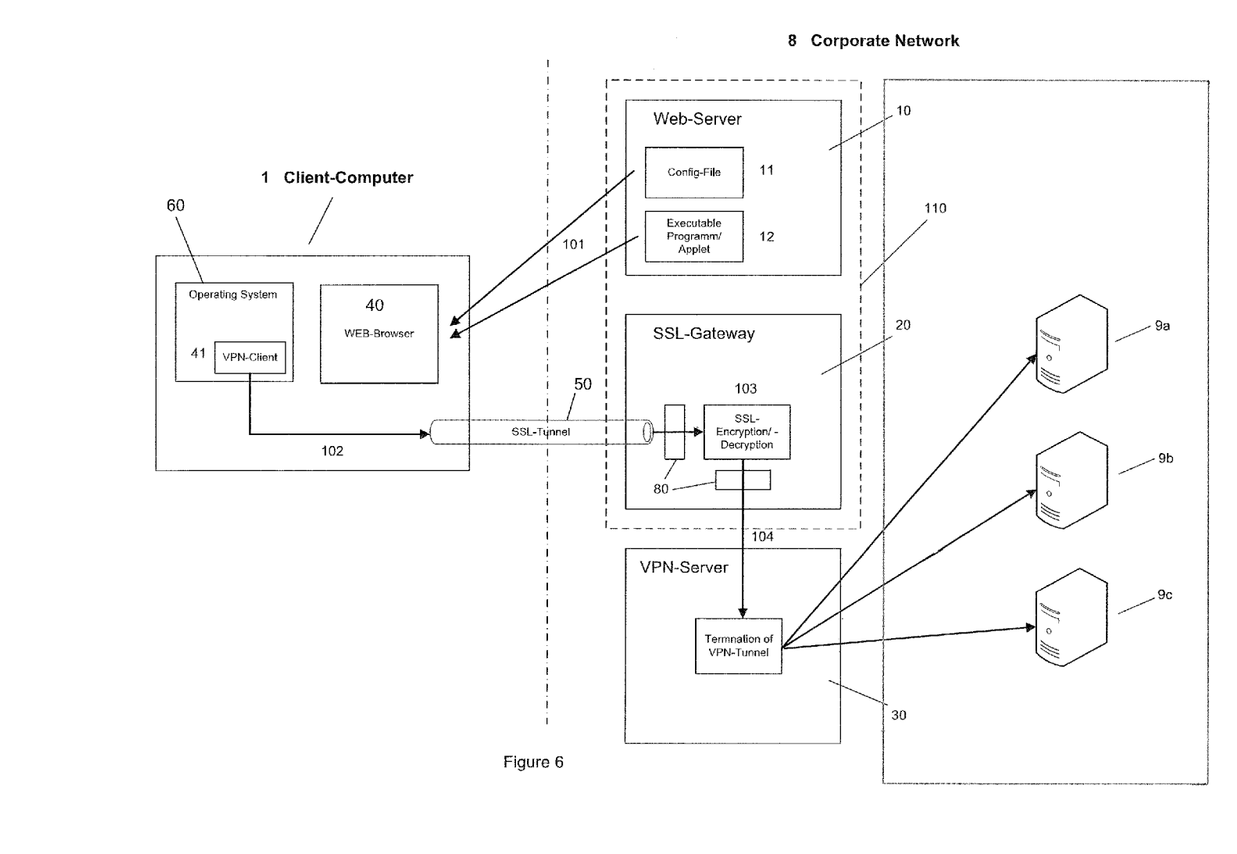
FIG. 6 is a schematic diagram reflecting a computer communication system according to the present invention.

Now referring to FIG. 6 the system according to the invention is to be explained in a more or less abstract form as follows:

On a client computer 1 the VPN user starts a WEB-browser 40 and navigates to a Web-server 10 which is preferentially inside the corporate network 8. After successful authentication at this server the user is able to download—represented by arrow 101—two pieces of software from that WEB-server 10, namely on the one hand a configuration file 11 that holds the parameters for configuring the VPN-client 41 installed in the operating system 60 of the client computer 1 and on the other hand a small applet type application 12 which is executable within the environment of the client's WEB-browser 40. Said program 12 is first responsible for configuring and starting the built-in VPN-client 41 and second for building up a SSL-encrypted tunnel connection 50 to an SSL-gateway 20 that is also present in the corporate network 8. The WEB-server 10 and the SSL-gateway 20 may be integrated in the same hardware 110, alternatively there may be two different machines. In a further step 102 said program will redirect the data stream, produced by the built-in VPN-client 41, into the SSL tunnel 50.

At the other end of the SSL-tunnel 50 the SSL gateway 20 receives the SSL-encrypted data stream. It decrypts the data stream in a section 103 and subsequently it delivers the data to a further VPN-server 30 which terminates the VPN-connection that originates at the built-in VPN-client 41. Finally, after terminating the VPN connection and removing all the VPN protocol headers, said VPN-server 30 delivers the original data to its destination servers 9 in the corporate network 8.

The SSL gateway 20 comprises a packet filter 80 that is configurable to limit access from the client 1 to resources in the corporate network 8 and/or from the corporate network 8 to the client 1.

In the following passages all the actions and data flow, stated above, will be explained in detail.

Today most WEB-clients comprise a Web-browser with an integrated Java® virtual machine. Using such a Web-browser it is possible to download and execute a Java® applet. A Java® applet is a software program, usually written in the Java® programming language, which can be executed by Web-browsers for many platforms, including MS® Windows®, UNIX®, Mac OS® and Linux® in the environment of said Java® virtual machine. Alternatively ActiveX®-controls can be used for functionality that is not included in the Web-Browser. ActiveX® is a Microsoft® technology and denotes reusable software components which can run in some WEB-browsers, for instance Microsoft's "Internet Explorer®".

So in the present solution, a Java® Applet or ActiveX®-Control is downloaded from a Web server which is reachable over the public Internet. This Java® Applet or Active-X®-Control includes
- all the necessary authentication modules
- the necessary HTTP or SOCKS parts to make connections through proxies
- the SSL encryption modules. (Alternatively, the SSL modules which are already included in the Java® virtual machine can be used.)

In the preferred embodiment of the invention said Java® applet (or Active-X-Control or other executable downloaded and started by the downloaded Web page) now listens (i.e. it executes the listen( ) function) on localhost port 1701 which is the well-known UDP port used by L2TP. If L2TP is used without IPSec, the Java® Applet or Active-X®-Control may create a socket for UDP on localhost port 1701 and so can exchange L2TP packets with the part of the operating system which includes the built-in VPN client.

If encryption for L2TP should be used also UDP packets from port 500 (ISAKMP) and packets of type ESP for IPSec encryption would have to be tunneled. But in the current prior art installations, UDP port 500 cannot be received on localhost, since the available clients use sockets in the way that the created socket for port 500 is valid for all IP addresses. So no second socket receiving data on port 500 with localhost can be created. Therefore in this embodiment of the invention L2TP without IPSec encryption is preferred. That does not matter since all the data from the client to the gateway is secured by SSL and therefore no additional L2TP encryption is necessary.

In another embodiment of the invention the PPTP protocol is used by the built-in VPN client. As discussed earlier in the section about the prior art, PPTP includes traffic of TCP packets (for tunnel creation and maintenance) and GRE packets (for transport of user data). GRE means "Generic Routing Encapsulation" as defined in the document RFC 2637.

Therefore TCP packets from port 1723, which is the well-known port of PPTP, and GRE packets have to be tunnelled. Again the Java® applet or Active-X®-Control listens on localhost TCP port 1723. The traffic from this port is then sent into the SSL-tunnel to the SSL-gateway in the corporate network.

The Java® Applet (or other application downloaded as mentioned above) also creates a RAW-socket with protocol GRE (IP protocol number 0x2F). The SSL tunnel forwards both types of traffic, TCP and GRE, between the client and the SSL gateway. As SSL uses TCP as a transport protocol and as TCP is a streaming protocol, where packets received may differ in size, each TCP or GRE packet has a header which contains the length and the type. The type is either TCP or GRE.

When GRE packets are sent through the SSL tunnel, it is not necessary to include the IP headers received, since the IP headers do not contain any useful information and have to be reconstructed at the other side anyway.

Now the virtual private network client (which uses PPTP or analogous L2TP) of the client machine is started. In Microsoft Windows this is done using the API-call "CreateProcess" which is starting "rasdial.exe". When "rasdial.exe" is started, the following parameters are given:
Name of configuration in configuration file
User-ID
Password
/PHONEBOOK: with name of downloaded configuration file *.pbk The configuration file *.pbk is also downloaded from the same location as the Java Applet or Active-X-Control. The necessary parameters of the "CreateProcess" API-call are received by the Java Applet over a SSL tunnel.

One of the most important parameters of the configuration file *.pbk is the IP address of the VPN server. By setting the loopback address 127.0.0.x as destination address for VPN data it is possible to redirect the data stream into the SSL tunnel connection.

In MAC OS X or Linux, a PPTP or L2TP client is not built in as default. But these operating systems contain a PPP daemon. The PPP daemon is normally used as a VPN client for communication over a modem on a serial line, for example with a telephone modem.

So in these operating systems, the downloaded Java Applet contains JNI shared libraries (also downloaded with the Java® Applet) which do fork( ) and execv( ) to start the PPP daemon built into the operating system. JNI (Java Native Interface) is a programming framework that allows Java Code running in the Java virtual machine (JVM) to call native applications and libraries written in other programming languages, such as C, C++ and assembly.

Using PTY-pseudo-terminal, which is included in the downloaded part of the Java® Applet, data are exchanged with the PPP daemon. As the PPP daemon normally works over serial lines, the data stream contains Flag Sequence, Control Escape and CRC=cyclic redundancy check characters as defined in RFC 1662 (PPP in HDLC-like Framing) As this type of coding is useless over TCP or SSL it can be removed before sending the data via SSL to the SSL gateway.

Vice versa when data from the SSL gateway is received, these protocol elements have to be added.

Over the TCP or SSL connection, L2TP header may be added when the VPN server wants to speak L2TP over TCP/SSL. But the L2TP headers are useless overhead, and so the Java® Applet and the gateway may talk a special protocol under the invention. This protocol is more economical.

In the corporate network, there is the SSL-Gateway. This SSL-Gateway either includes the PPP/PPTP- or PPP/L2TP-VPN server, or it forwards the traffic to an appropriate VPN server.

The PPTP/L2TP-VPN server is either separate from the SSL-gateway, or it is included in the SSL-gateway. When the PPTP/L2TP-VPN server is separate from the SSL-gateway, a special TCP tunnel can be used between them. When the original TCP and GRE packets are exchanged, the gateway catches the call-IDs which are negotiated for PPTP over the PPTP TCP connections. Later this call-ID is included in every GRE packet. So when there are multiple connections between the SSL-gateway and the PPTP-VPN server and the SSL-gateway receives GRE packets, the SSL-gateway knows from the call-ID included in every received GRE packet to which client this packet belongs. So the SSL-gateway can forward each received GRE packet to the corresponding client. In this way, full access to the corporate network is possible without installing any software on the client and without having administrator rights.

When Java Applets or Active-X-Controls are used, there is the problem that these programs are automatically terminated when the user navigates to another Web-Page with the Web-Browser. A possible solution to this problem in Microsoft Windows is to additionally download an executable from the Web-Server. This executable is started by "CreateProcess" in the Java JNI DLL.

In MAC OS and on Linux, the same is possible, but it is even more easy to start a process through fork( ). So in MAC OS or Linux, no executable needs to be downloaded from the Web-Server, only the shared library accessed from the Java Applet as JNI.

When the new process outside the Web-Browser is created, this can exchange all necessary data with the Java® Applet or Active-X-Control using normal interprocess communication like shared memory or pipes. This newly created process contains the SSL code, it gets information about proxies and authentication from the Java® Applet or Active-X®-Control, and then creates the SSL-tunnels.

In the corporate network, at the point where the client's VPN packets enter the corporate network or vice versa, where the VPN packets which are sent to the client leave the corporate network, a packet filter may be included. This packet filter can be configured separately for every user or for every group of users. The packet filter may block IP packets sent from the client to specific destinations in the corporate network, and it may block IP packets sent from specific sources inside the corporate network to the client.

In this way, computer resources in the corporate network are protected from unauthorized access by the client, and also the client is protected from unwanted access from inside the corporate network.

Often large organisations have corporate networks that consist of multiple network segments, each segment having only limited access to resources in other segments. Segments can be made of different departments for example. But these large organisations often want to have only one farm of SSL-gateways to terminate the connections from outside. In this scenario, it is possible to place the PPTP- or L2TP-VPN servers in the network segments, and with TCP tunnels having connections between the SSL-gateways and that PPTP- or L2TP-VPN servers.

Further on in this scenario, users in the public Internet having access through SSL may only have restricted access to data in the network segment they logically are belonging to.

What is claimed is:

1. A computer communication system, comprising:
   a client computer running an operating system with an integrated PPP daemon that has a built in virtual private network (VPN) client and located in a public network;
   at least one server computer located in a corporate network;
   a web server remote from said client computer;
   a SSL or IPSec gateway computer located in said corporate network, said SSL or IPSec gateway comprising a packet filter configured to limit access to and from the client computer to resources in the corporate network; and
   a VPN server computer located in said corporate network, wherein the computer communication system is configured to provide a safe VPN communication connection between said client and at least one of said server computers,
   wherein said client computer, using a WEB browser, downloads a configuration file having parameters for configuring the built-in VPN client and a second downloaded VPN client application that is stored on a non-transitory computer readable medium to be run on the client computer, from said web server over the
   Internet, the executable program/applet type application being executable within the client computer's WEB browser,
   wherein said downloaded VPN client application is programmed to perform the following functions:
   automatically configuring the PPP daemon that is used as the VPN client of the operating system installed on said client computer, establishing an SSL or IPSec encrypted tunnel connection from said client computer to said SSL or IPSec gateway computer which is part of said corporate network, and
   obtaining PPP packets from the PPP daemon, containing payload data of applications running locally on the client computer using a Pty-pseudo terminal,
   wherein all the PPP packets containing the payload data generated by the PPP daemon are encrypted at the client computer by the downloaded VPN client application and sent through said tunnel connection to the SSL or IPSec gateway computer and are further forwarded via the SSL or IPSec gateway computer to the VPN server in said corporate network, in order to set a fully transparent VPN tunnel between the client computer and the corporate network.

2. A computer communication system according to claim 1, wherein the SSL or IPSec encrypted tunnel connection between the client computer and the SSL or IPSec gateway computer is secured by the use of a SSL or IPSec encryption protocol.

3. A computer communication system according to claim 1, wherein at the client computer a process is started by the downloaded applet type application which causes the client computer to establish said SSL or IPSec encrypted tunnel connection.

4. A computer communication system according to claim 1, wherein the downloaded applet type application contains shared libraries that run the commands "fork( )" and "execv( )" to start the PPP daemon that is integrated into the operating system.

* * * * *